M. V. ANDREWS AND S. W. HOLMAN.
WATER MOTOR PUMP.
APPLICATION FILED JAN. 29, 1920.
1,352,237.
Patented Sept. 7, 1920.
3 SHEETS—SHEET 1.
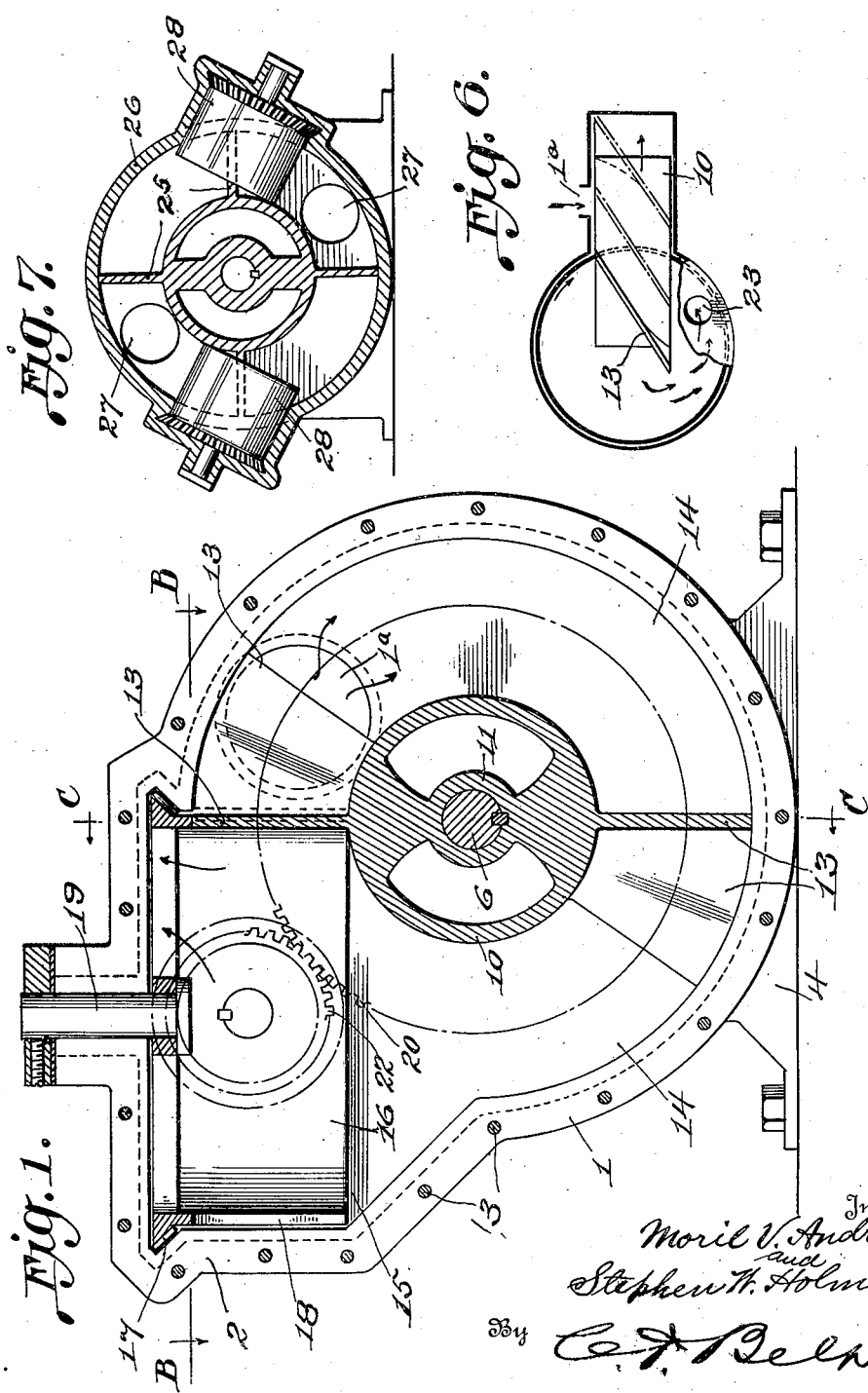

M. V. ANDREWS AND S. W. HOLMAN.
WATER MOTOR PUMP.
APPLICATION FILED JAN. 29, 1920.
1,352,237.
Patented Sept. 7, 1920.
3 SHEETS—SHEET 3.
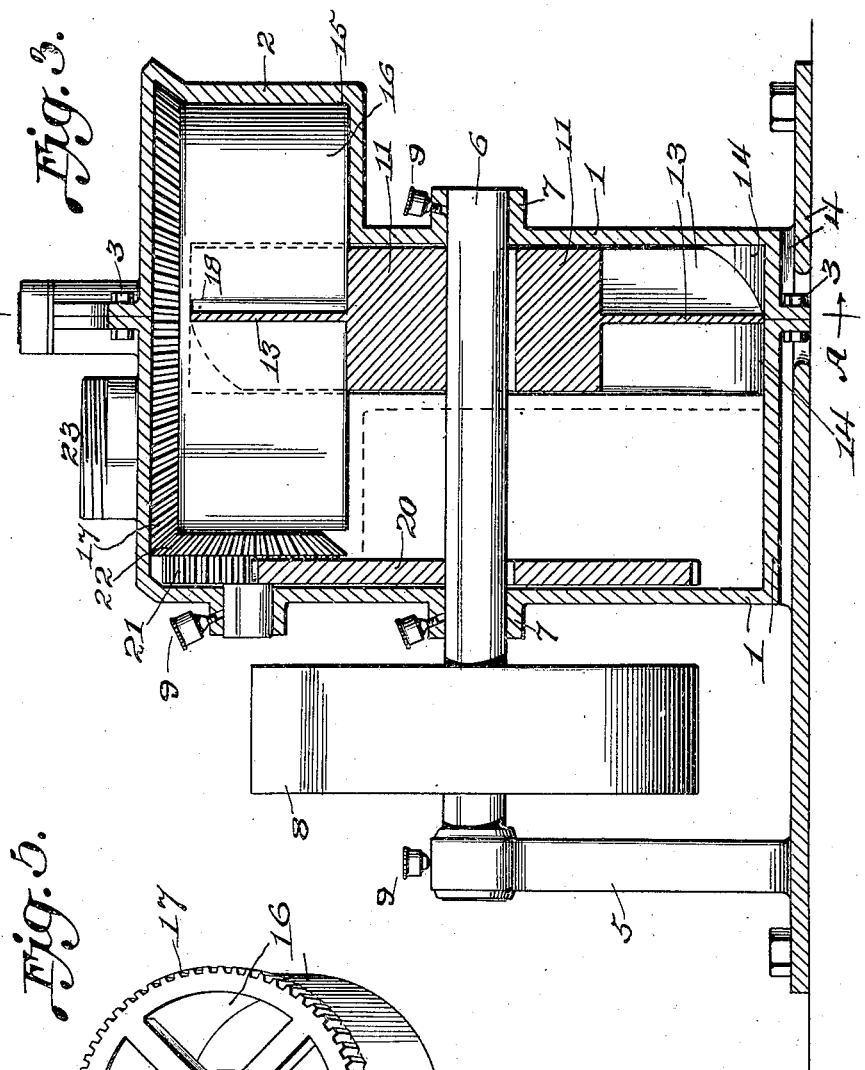
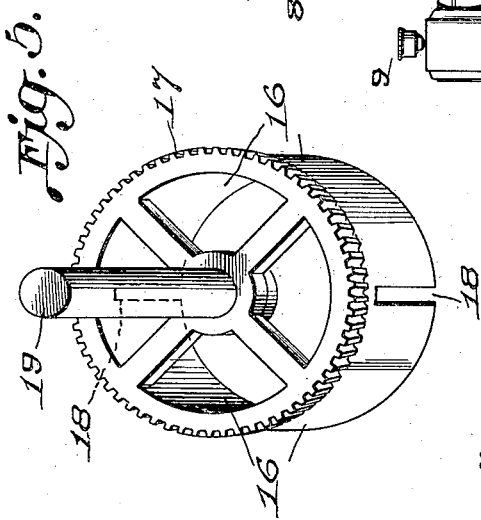
Inventors
Moril V. Andrews
and
Stephen W. Holman
By C. F. Belt
Attorney

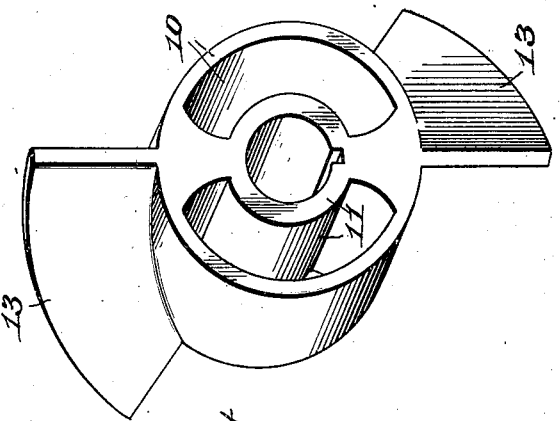
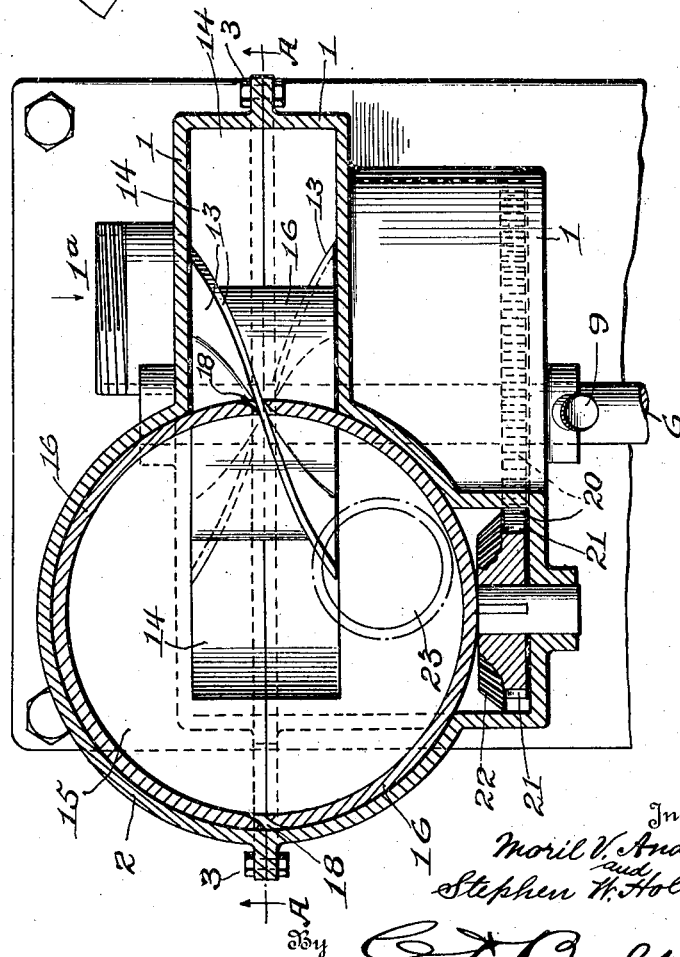

UNITED STATES PATENT OFFICE.

MORIEL V. ANDREWS AND STEPHEN W. HOLMAN, OF MARMARTH, NORTH DAKOTA.

WATER-MOTOR PUMP.

1,352,237. Specification of Letters Patent. Patented Sept. 7, 1920.

Application filed January 29, 1920. Serial No. 354,954.

*To all whom it may concern:*

Be it known that we, MORIEL V. ANDREWS and STEPHEN W. HOLMAN, citizens of the United States, residing at Marmarth, in the county of Slope and State of North Dakota, have invented certain new and useful Improvements in Water-Motor Pumps, of which the following is a specification.

This invention relates to centrifugal motor pumps of rotary type, and pertains especially to a water motor pump involving water gates revoluble perpendicular to the axis of revolution of water vanes.

The object of the invention is to provide in a water motor, a revoluble water controlling gate through which water is discharged from the pump, and water-lifting blades or vanes revoluble through and on an axis perpendicular to the axis of the gate for carrying water into the gate.

A further object of the invention is to provide in a water motor, revoluble water gates, revoluble water vanes or blades, and gear mechanism for imparting the motion of a driven shaft, which revolves the vanes, to the gates for revolving the gates on an axis perpendicular to the axis plane of the vanes.

A still further object of the invention is to provide a motor pump having a circular water chamber, a circular subchamber laterally disposed with respect to and opening into said chamber, said chambers adapted to contain respectively revoluble water vanes and a water gate revoluble simultaneously with the vanes on an axis perpendicular to the axis plane of the vanes.

A still further object of the invention is to provide, in a motor pump, a cylindrical gate having a peripheral gear and slots through which revoluble vanes pass during the revolution of the gate and the vanes.

Various other objects, advantages and improved results are attainable in the manufacture and practical application of the invention.

In the accompanying drawings forming part of this application:—

Figure 1. is a sectional side elevation with one half of the casing removed and as looking in the direction of the arrows A in Figs. 2 and 3.

Fig. 2. is a sectional view taken on the dotted line B—B Fig. 1.

Fig. 3 is a sectional view taken on the dotted line C—C Fig. 1.

Fig. 4 is a detail perspective view of the vane device.

Fig. 5 is a similar view of the gate.

Fig. 6 is a detail diagram illustrating as in top view the coöperation of the gate and the vane device.

Fig. 7 is a sectional view of a modified pump illustrating an arrangement of the gates and vanes in duplication.

The same reference characters denote the same parts throughout the several views of the drawings.

In perfecting the construction and operation of this motor pump, it is important that the cylindrical casing 1 and the sub-casing 2 should have such relative arrangement as to permit the vanes to carry water into the gate during the revolution of the gate and of the vanes, and for this reason, we have devised special casing members in particular relative arrangement. Preferably the casing 1 and the sub-casing 2 are formed in two duplicate parts which are bolted together annularly as at 3, so as to inclose the pump elements hereinafter described, and the pump is supported in fixed position by a suitable base 4, having a standard 5 in which one end of a driven shaft 6 is journaled, and the sides of the casing 1 has journal bearings 7 for said shaft, which extends centrally through the casing 1, and is provided with a driven pulley 8, the various journal bearings being provided with suitable oil cups 9.

Another important feature of our invention is to so construct and operate the gate with relation to the construction and operation of the vane device as to permit the vanes to pass through the gate and thereby carry water into the gate for discharge therefrom.

The vane device comprises a drum member 10 having a central hub 11 keyed to the driven shaft 6 which revolves said device centrally within the casing 1 which has an intake 1ª. The periphery of the drum has formed thereon a pair of oppositely disposed water lifting blades or vanes 13 of such depth and width as to make a water tight engagement with the walls of the casing 1 forming the water channel or chamber 14. The vanes are made in relative spiral shape and extend spirally from one to end face of the drum to the opposite face thereof so as to afford a spiral like lift of the water.

The sub-casing 2 is preferably made as part of the casing 1, and intersects the casing 1 so as to form a gate chamber 15. The cylindrical walls of the gate chamber 15 are perpendicular to the axis plane of the casing 1, so that the chambers 14 and 15 overlap for purposes hereinafter explained.

The water exit-controlling gate comprises a cylindrical shell 16 having open ends, and is provided with an outer peripheral beveled gear 17. The shell 16 has a pair of oppositely located slots 18 extending from adjacent the gear 17 throughout the depth of the shell. The gate is revolubly suspended centrally within the chamber 15 by a hanger 19, and is revolved by a main gear wheel 20 keyed to the shaft 6 and meshing with a pinion 21 on a beveled pinion 22 which meshes with the beveled gate gear 17. Obviously these gears are of such relative size and pitch as to revolve the gate and the vane device in unison and in planes of perpendicular axis, and so that the blades or vanes successively pass through the slots 18, whereby the vanes successively carry the water into the gate shell for discharge therefrom by way of the geared end of the gate and through the discharge opening or coupling 23 in the sub-casing 2.

It will be seen that the gate shell acts as a water cut-off and discharge, that the length of the gate slots is equal to the depth of the vanes or blades, that the vane drum and the gate are revolved in unison and that the gate is so placed in relation to the intake and discharge as to have the gate shell separate the intake from the discharge, and permit the vanes to successively pass through the shell while the water is being discharged from the shell perpendicular to the plane of axis of the vanes.

Obviously the diagonal position of the blades or vanes with respect to the vane hub is such that the blades have a spiral action, not only reduces the lifting resistance of the water, but also produces a continuous flow of water through the gate shell.

Referring to Fig. 7 of the drawings, the vanes or blades are duplicated in two pairs as 25, revoluble in a casing 26 having two intakes 27 separated by a pair of revoluble geared gates 28 through which the vanes successively revolve for lifting the water through the gates.

Obviously the gate device and the vane device may be used in like combination as herein shown, for blowers or pneumatic purposes, and for various other purposes of the same character, therefore, we do not wish to be understood as limiting ourselves in the practical application of the invention, nor to any particular size, shape or form, nor to any particular number of gates and vanes, but reserve the right to make such changes and variations in the manufacture and practical application of the invention as may not be inconsistent with the appended claims.

Having thus described our invention what we claim as new and desire to secure by Letters Patent is:—

1. In a water motor pump of the character described, a pair of spiral lifting vanes, a cylindrical open end gate revoluble between the vanes on an axis plane perpendicular to the axis plane of the vanes and permitting the vanes to pass through the wall of the gate while the water is passing through the ends of the gate, and means for revolving the vanes and the gate in unison.

2. In a water motor pump of the character described, a revoluble gate having open ends for the passage of water therethrough and a pair of slots, and spiral vanes revolving through one of said ends and through the slots in a pumping operation.

In witness whereof we hereunto set our hands in the presence of two witnesses.

MORIEL V. ANDREWS.
STEPHEN W. HOLMAN.

Witnesses:
N. O. CARK,
JAMES GANTZ.